US012646360B2

(12) United States Patent
Tsuge et al.

(10) Patent No.: US 12,646,360 B2
(45) Date of Patent: Jun. 2, 2026

(54) RESIDUAL LIFE DETERMINATION SYSTEM AND RESIDUAL LIFE DETERMINATION METHOD

(71) Applicant: HONDA MOTOR CO., LTD., Tokyo (JP)

(72) Inventors: Hodaka Tsuge, Tokyo (JP); Hiroshi Ishikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 349 days.

(21) Appl. No.: 18/458,557

(22) Filed: Aug. 30, 2023

(65) Prior Publication Data

US 2024/0144733 A1 May 2, 2024

(30) Foreign Application Priority Data

Oct. 27, 2022 (JP) ................................. 2022-172125

(51) Int. Cl.
*G07C 5/00* (2006.01)
*G01M 17/00* (2006.01)
(52) U.S. Cl.
CPC ............... *G07C 5/00* (2013.01); *G01M 17/00* (2013.01)
(58) Field of Classification Search
CPC ......... G07C 5/00; G07C 5/006; G01M 17/00;

G01M 17/007; G01M 13/00; G01M 17/06; G05B 23/0283; B60W 50/0205; G01R 31/00; G01R 31/26
See application file for complete search history.

(56) References Cited

U.S. PATENT DOCUMENTS

2023/0267783 A1* 8/2023 Osada ................. G07C 5/0808
701/33.4

FOREIGN PATENT DOCUMENTS

JP 2001032724 A * 2/2001
JP 2008-128149 A 6/2008

* cited by examiner

*Primary Examiner* — Timothy P Graves
(74) *Attorney, Agent, or Firm* — Rankin, Hill & Clark LLP

(57) ABSTRACT

A residual life determination system includes: a first estimated residual life recognition unit configured to recognize a first estimated residual life of the target component according to a cumulative fatigue degree of the target component based on the load measurement information; a second estimated residual life recognition unit configured to recognize a second estimated residual life of the target component according to a degradation degree of the physical property value of the target component based on the physical property value measurement information; and a residual life determination unit configured to determine the residual life of the target component based on the first estimated residual life in a first period before the second estimated residual life becomes longer than the first estimated residual life.

7 Claims, 14 Drawing Sheets

TRAVEL DISTANCE

FIG.14

| TARGET COMPONENT | ELEMENT OF FATIGUE DEGREE TO BE MEASURED | PHYSICAL PROPERTY VALUE TO BE MEASURED |
|---|---|---|
| CAPACITOR IN ELECTRONIC CIRCUIT BOARD | ELECTRIC POWER, TEMPERATURE | ELECTROSTATIC CAPACITY |
| ROTATING BODY SUCH AS MOTOR | SHAFT TORQUE, ROTATING SPEED, TEMPERATURE | MAGNITUDE OF DEVIATION OF SHAFT |
| WIRING OF PRINTED CIRCUIT BOARD | ELECTRIC POWER, TEMPERATURE | ELECTRIC RESISTANCE OF DUMMY CIRCUIT BOARD |
| FASTENING PART | VIBRATION NUMBER OF TIMES, ACCELERATION SPEED | HAMMERING SOUND |
| RESIN COMPONENT | TEMPERATURE, VIBRATION NUMBER OF TIMES | ELASTIC MODULUS OF DUMMY COMPONENT, HAMMERING SOUND |
| SEAL PART | TEMPERATURE, VIBRATION NUMBER OF TIMES | RUBBER HARDNESS OF DUMMY COMPONENT |

RESIDUAL LIFE DETERMINATION SYSTEM AND RESIDUAL LIFE DETERMINATION METHOD

INCORPORATION BY REFERENCE

The present application claims priority under 35 U.S.C. § 119 to Japanese Patent Application No. 2022-172125 filed on Oct. 27, 2022. The content of the application is incorporated herein by reference in its entirety.

BACKGROUND OF THE INVENTION

Field of the Invention

The present invention relates to a residual life determination system and a residual life determination method.

Description of the Related Art

Conventionally, a configuration of calculating a fatigue degree of a driving power transmission device provided in a vehicle from a relation predetermined based on torque inputted to the driving power transmission device and restricting output torque of an engine according to the fatigue degree has been proposed (for example, see Japanese Patent Laid-Open No. 2008-128149). By the configuration, engine torque is restricted within a range of avoiding excess according to a remaining life of the driving force transmission device.

In vehicle design, such a case is assumed that a hard user with a high use frequency moves a stipulated distance in a stipulated number of years, and a life of components used in a vehicle is designed with a further margin. Therefore, when a user of a general use frequency uses a moving body, the moving body can be used exceeding the stipulated number of years or the stipulated distance.

However, since a residual value of a vehicle is set with a model year and a travel distance as main determination elements, it deviates from an actual value for the vehicle used by a general user. Further, the users often feel uneasy about the residual life of the vehicle as the number of years of use and the travel distance increase and let go of the vehicle early even though there is a margin in the residual life of the components.

The present application is implemented in consideration of such a background, and it is an object to provide a residual life determination system and a residual life determination method capable of appropriately determining a residual life of components used in a moving body such as a vehicle and contributing to value determination of the moving body.

SUMMARY OF THE INVENTION

A first aspect for achieving the object described above is a residual life determination system which determines a residual life of a target component provided in a moving body, and the residual life determination system includes: a load measurement information acquisition unit configured to acquire load measurement information indicating a measurement result of loads applied to the target component when the moving body is used; a first estimated residual life recognition unit configured to recognize a first estimated residual life of the target component according to a cumulative fatigue degree of the target component based on the load measurement information; a physical property value measurement information acquisition unit configured to acquire physical property value measurement information indicating a measurement result of a physical property value of the target component; a second estimated residual life recognition unit configured to recognize a second estimated residual life of the target component according to a degradation degree of the physical property value of the target component based on the physical property value measurement information; and a residual life determination unit configured to determine the residual life of the target component based on the first estimated residual life in a first period before the second estimated residual life becomes longer than the first estimated residual life.

The residual life determination system described above may be configured such that the residual life determination unit determines the residual life of the target component based on the second estimated residual life in a second period after the second estimated residual life becomes longer than the first estimated residual life.

The residual life determination system described above may be configured such that the load measurement information acquisition unit acquires the load measurement information by receiving the load measurement information transmitted at a first timing from the moving body, the physical property value measurement information acquisition unit acquires the physical property value measurement information by receiving the physical property value measurement information transmitted at a second timing from a measuring device which measures the physical property value at the time of maintenance of the moving body, and the residual life determination unit determines the residual life of the target component based on the second estimated residual life recognized by the second estimated residual life recognition unit at the previous second timing and the first estimated residual life recognized by the first estimated residual life recognition unit at every first timing, in a period of time from the previous second timing to the next second timing in the second period.

The residual life determination system described above may be configured such that the residual life determination unit determines the residual life of the target component by correcting the first estimated residual life recognized by the first estimated residual life recognition unit at every first timing by the second estimated residual life recognized by the second estimated residual life recognition unit at the previous second timing, in the period of time from the previous second timing to the next second timing in the second period.

The residual life determination system described above may be configured such that the moving body is provided with a dummy test piece for measuring the physical property value of the target component, and the physical property value measurement information acquisition unit acquires the physical property value measurement information indicating the measurement result of the physical property value by the dummy test piece.

A second aspect for achieving the object described above is a residual life determination method executed by a computer in order to determine a residual life of a target component provided in a moving body, and the residual life determination method includes: a load measurement information acquisition step of acquiring load measurement information indicating a measurement result of loads applied to the target component when the moving body is used; a first estimated residual life recognition step of recognizing a first estimated residual life of the target component according to a cumulative fatigue degree of the target component based on the load measurement information; a physical property value measurement information acquisition step of acquiring physical property value measurement information indicating a measurement result of a physical property value of the target component; a second estimated residual life recognition step of recognizing a second estimated residual life of the target component according to a degradation degree of the physical property value of the target component based on the physical property value measurement information; and a residual life determination step of determining the residual life of the target component based on the first estimated residual life in a first period before the second estimated residual life becomes longer than the first estimated residual life.

According to the residual life determination system described above, it is possible to appropriately determine a residual life of components used in a moving body such as a vehicle and contribute to value determination of the moving body.

BRIEF DESCRIPTION OF THE DRAWINGS

FIG. 14 is a list exemplifying the target component.

DETAILED DESCRIPTION OF THE PREFERRED EMBODIMENTS

1. Configuration of Residual Life Determination System

Figure 1:
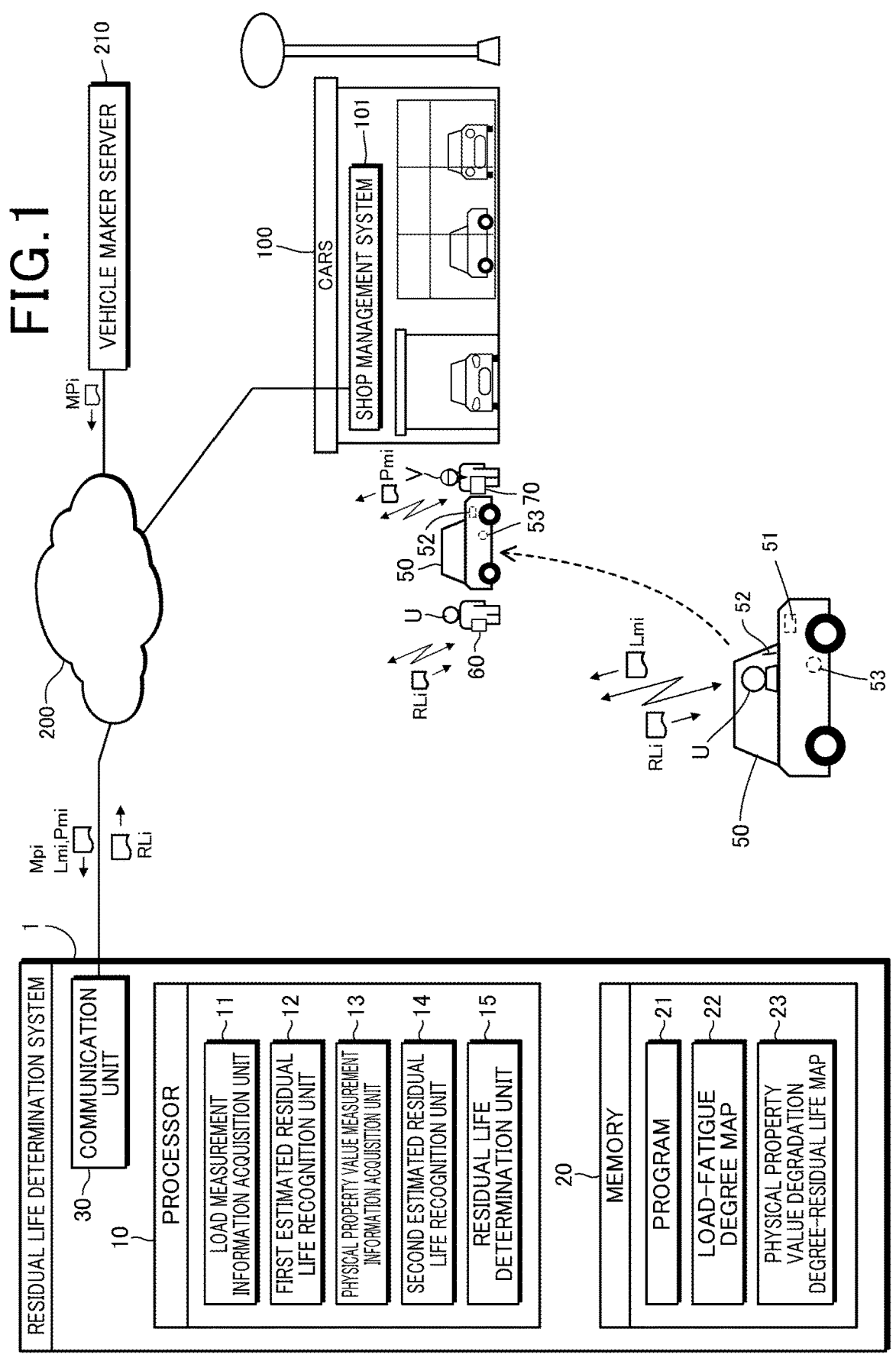
FIG. 1 is an explanatory drawing of a configuration of a residual life determination system.

With reference to FIG. 1, the configuration of a residual life determination system 1 of the present embodiment will be explained. The residual life determination system 1 performs processing of determining a residual life of a target component 53 provided in a vehicle 50. The vehicle 50 corresponds to a moving body of the present disclosure. The residual life determination system 1 is a computer system including a processor 10, a memory 20, and a communication unit 30 or the like.

The residual life determination system 1 communicates with an Electronic Control Unit (ECU) 51 provided in the vehicle 50, a user terminal 60 used by a user U of the vehicle 50, a shop management system 101 of a car dealer 100 who performs maintenance or the like of the vehicle 50, a measuring device 70 used by a staff V of the car dealer 100, and a vehicle maker server 210 or the like via a communication network 200 by the communication unit 30.

The vehicle 50 includes a sensor which detects a load applied to the target component 53, and the ECU 51 transmits load measurement information Lmi indicating a detection result of the load detected by the sensor when the vehicle 50 is used to the residual life determination system 1 when a power source of the vehicle 50 is turned on or the like. In addition, when the vehicle 50 is brought to the car dealer 100 for the maintenance such as a periodic inspection, the staff V measures a physical property value of the target component by the measuring device 70, and physical property value measurement information Pmi indicating a measurement result is transmitted from the measuring device 70 to the residual life determination system 1. Note that the physical property value measurement information Pmi may be transmitted from the measuring device 70 to the residual life determination system 1 via the shop management system 101.

The vehicle maker server 210 transmits map information MPi including a map (load-fatigue degree map) for converting a detection value of the load indicated by the load measurement information Lmi to a fatigue degree of the target component 53 and a map (physical property value degradation degree-residual life map) for converting a measurement value of the physical property value indicated by the physical property value measurement information Pmi to an estimated residual life of the target component 53, to the residual life determination system 1.

The memory 20 of the residual life determination system 1 preserves a program 21 for control of the residual life determination system 1, and data 22 of the load-fatigue degree map and data 23 of the physical property value degradation degree-residual life map, which are acquired from the map information MPi. The processor 10 functions as a load measurement information acquisition unit 11, a first estimated residual life recognition unit 12, a physical property value measurement information acquisition unit 13, a second estimated residual life recognition unit 14 and a residual life determination unit 15, by reading and executing the program 21.

Processing executed by the load measurement information acquisition unit 11 corresponds to a load measurement information acquisition step in a residual life determination method of the present disclosure, and processing executed by the first estimated residual life recognition unit 12 corresponds to a first estimated residual life recognition step in the residual life determination method of the present disclosure. Processing executed by the physical property value measurement information acquisition unit 13 corresponds to a physical property value measurement information acquisition step in the residual life determination method of the present disclosure, and processing executed by the second estimated residual life recognition unit 14 corresponds to a second estimated residual life recognition step in the residual life determination method of the present disclosure. Processing executed by the residual life determination unit 15 corresponds to a residual life determination step in the residual life determination method of the present disclosure.

The load measurement information acquisition unit 11 receives and acquires the load measurement information Lmi transmitted from the vehicle 50, by the communication unit 30. A timing at which the load measurement information acquisition unit 11 acquires the load measurement information Lmi corresponds to a first timing of the present disclosure. The first estimated residual life recognition unit 12 recognizes a first estimated residual life of the target component 53 according to a cumulative fatigue degree of the target component 53 based on the load measurement information Lmi.

The physical property value measurement information acquisition unit 13 receives and acquires the physical property value measurement information Pmi transmitted from the measuring device 70, by the communication unit 30. A timing at which the physical property value measurement information acquisition unit 13 acquires the physical property value measurement information Pmi corresponds to a second timing of the present disclosure. The second estimated residual life recognition unit 14 recognizes a second estimated residual life of the target component 53 according to a degradation degree of the physical property value of the target component 53 based on the physical property value measurement information Pmi.

For the first estimated residual life recognized by the first estimated residual life recognition unit 12 and the second estimated residual life recognized by the second estimated residual life recognition unit 14, the residual life determination unit 15 determines a residual life of the target component 53 based on the first estimated residual life in a first period before the second estimated residual life becomes longer than the first estimated residual life. In addition, the residual life determination unit 15 determines the residual life of the target component 53 based on the second estimated residual life in a second period after the second estimated residual life becomes longer than the first estimated residual life.

Details of the processing by the load measurement information acquisition unit 11, the first estimated residual life recognition unit 12, the physical property value measurement information acquisition unit 13, the second estimated residual life recognition unit 14, and the residual life determination unit 15 will be described later.

2. First Example

As the first example, the processing by the residual life determination system 1 when the target component 53 is a knuckle provided in the vehicle 50 will be explained with reference to FIG. 2 to FIG. 7. In the first example, the map information MPi transmitted from the vehicle maker server 210 includes the load-fatigue degree map illustrated in G1 in FIG. 2 and the physical property value degradation degree-residual life map illustrated in G3 in FIG. 3.

In the load-fatigue degree map illustrated in G1, a horizontal axis is set as the load applied to the knuckle, a vertical axis is set as weight of the degradation degree when each load is applied to the knuckle (a decreasing degree of the residual life of the knuckle), and a correspondence relation between them is illustrated. In the vehicle 50, the load applied to the knuckle is detected by an acceleration sensor. The load applied to the knuckle is indicated in a range of 0.5 to 2 with a reference load as 1, and the weight indicates a degree of degradation caused by the load of one time when the total load applied to the knuckle before the knuckle fails is 100%.

The weight is set based on a result of a knuckle durability test executed at a vehicle maker. That is, a person in charge at the vehicle maker executes the knuckle durability test while changing the load to be applied to the knuckle, and obtains a cycle count at which the knuckle fails (failure cycle count) by each load. Then, the person in charge generates the load-fatigue degree map of G1 using as the weight a value for which 100 is divided by the failure cycle count, for each load.

In the physical property value degradation degree-residual life map illustrated in G3, the horizontal axis is set as a Young's modulus change rate of the knuckle, the vertical axis is set as a residual life rate of the knuckle, and the correspondence relation between them is illustrated. The residual life rate indicates a ratio of a remaining life when the residual life of the knuckle at the point of time when the use of the vehicle 50 is started is 100%. The Young's modulus change rate indicates a change rate of a Young's modulus of the knuckle from the point of time when the use of the vehicle 50 is started. Note that measurement of the Young's modulus of the knuckle of the vehicle 50 at the car dealer 100 is performed by a nondestructive method such as sound velocity measurement.

The physical property value degradation degree-residual life map illustrated in G3 is set based on the result of the knuckle durability test by a fixed load executed at the vehicle maker. That is, the person in charge at the vehicle maker measures a relation between the cycle count and the Young's modulus at every stipulated number of times during the knuckle durability test by the fixed load, and defines the cycle count at which the knuckle fails as the cycle count at which the residual life rate of the knuckle becomes 0%. Then, the person in charge obtains the relation between the cycle count and the Young's modulus, converts the relation to the relation between a decreasing rate of the Young's modulus and the residual life rate, and generates the physical property value degradation degree-residual life map of G3.

Figure 4:
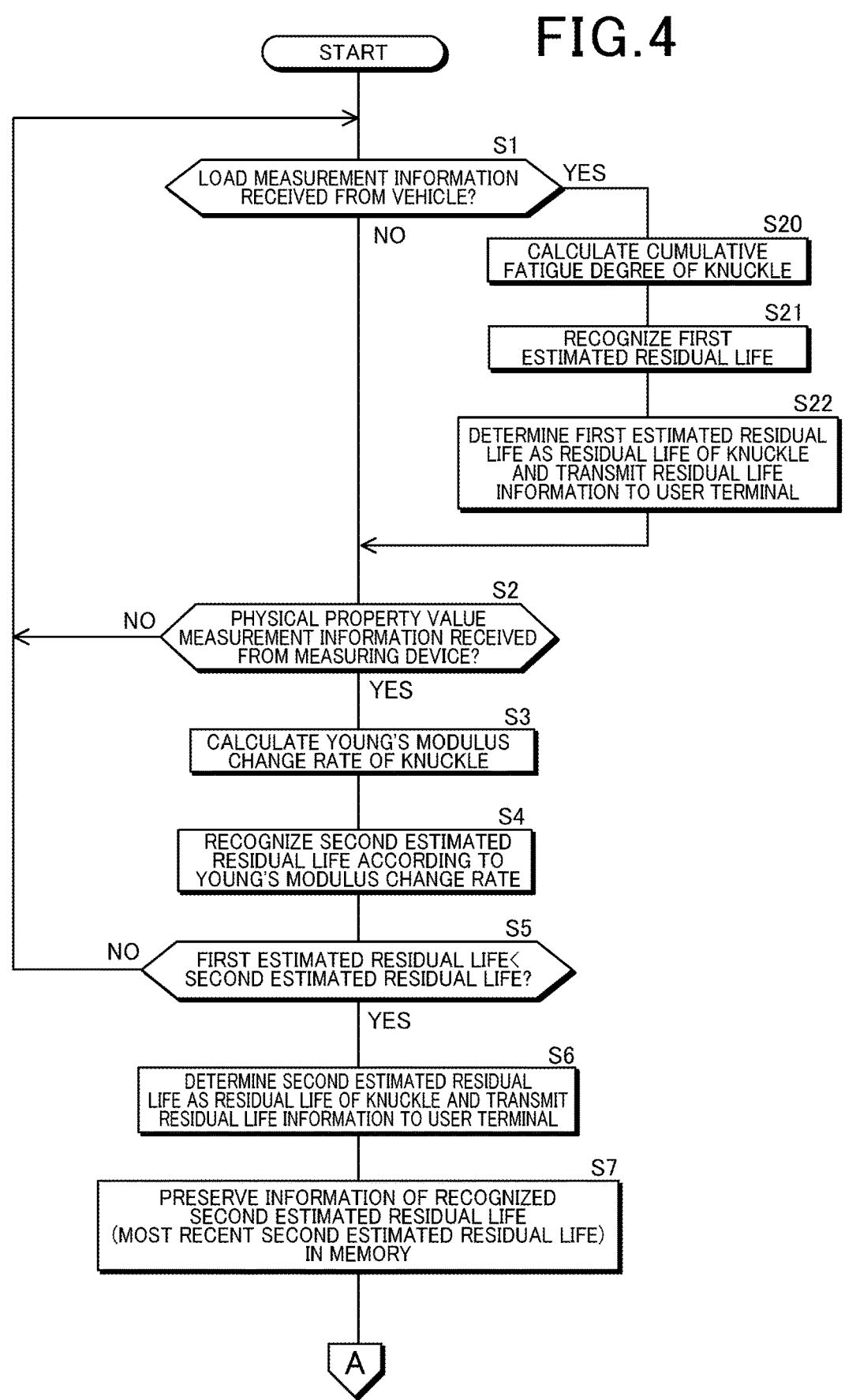
FIG. 4 is a first flowchart of residual life determination processing.
Figure 5:
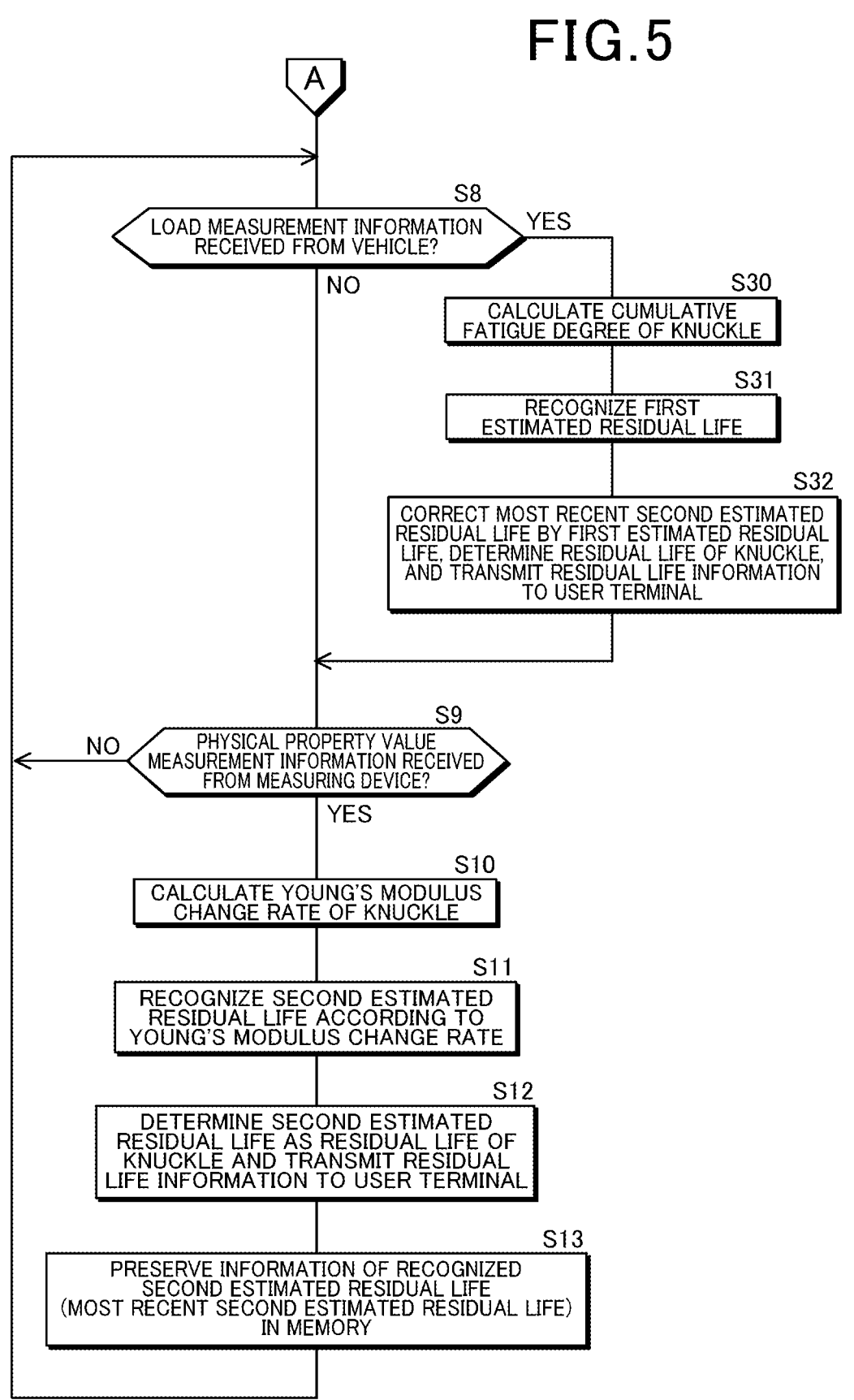
FIG. 5 is a second flowchart of the residual life determination processing.

Next, according to flowcharts illustrated in FIG. 4 and FIG. 5, a series of processing of knuckle residual life determination executed by the residual life determination system 1 will be explained. By loop processing of step S1 and step S2 in FIG. 4, the load measurement information acquisition unit 11 advances the processing to step S20 when the load measurement information Lmi transmitted from the vehicle 50 is received and acquired by the communication unit 30 in step S1. In addition, the physical property value measurement information acquisition unit 13 advances the processing to step S3 when the physical property value measurement information Pmi transmitted from the measuring device 70 is received and acquired by the communication unit 30 in step S2.

Figure 2:
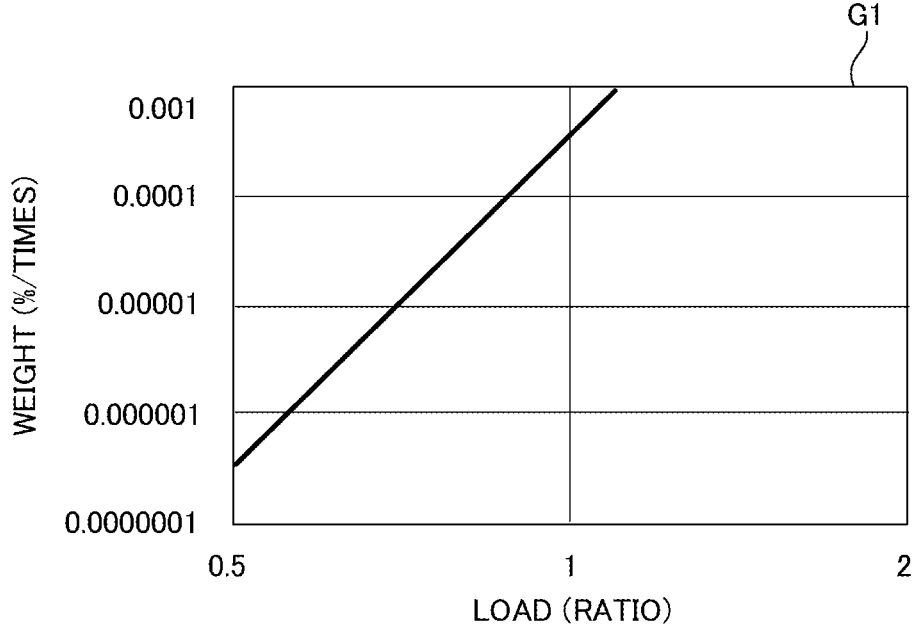
FIG. 2 is an explanatory drawing of a correspondence map between a load and a fatigue degree and calculation of a cumulative fatigue degree, with a knuckle as a target component.
Figure 2:
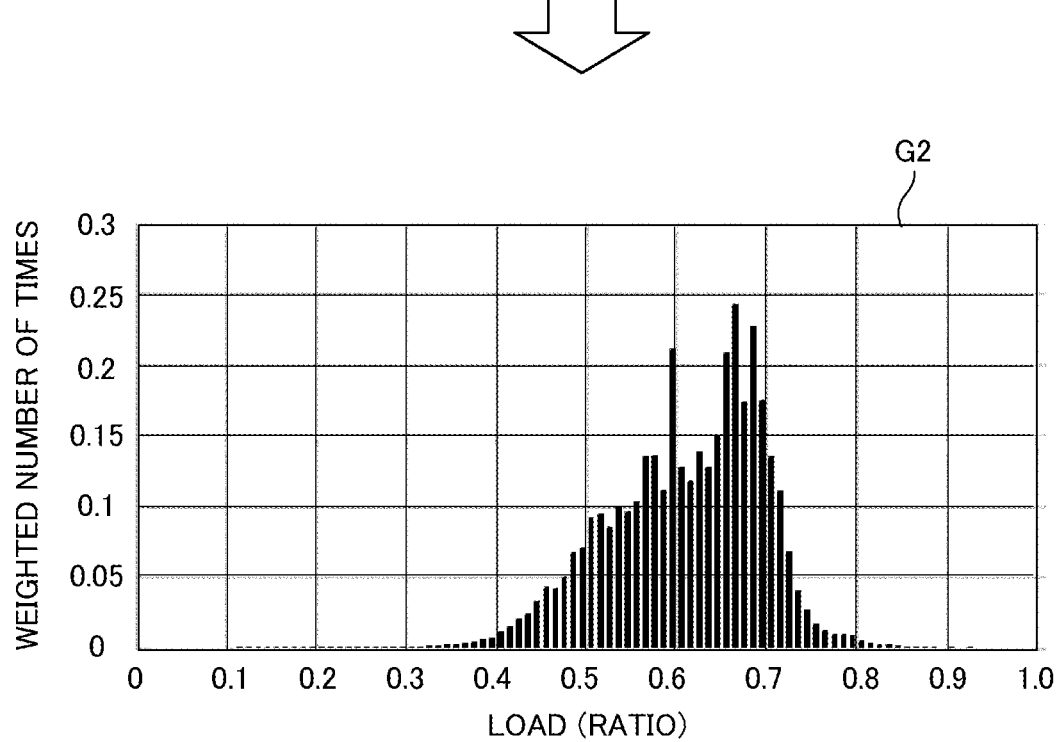
Figure 3:
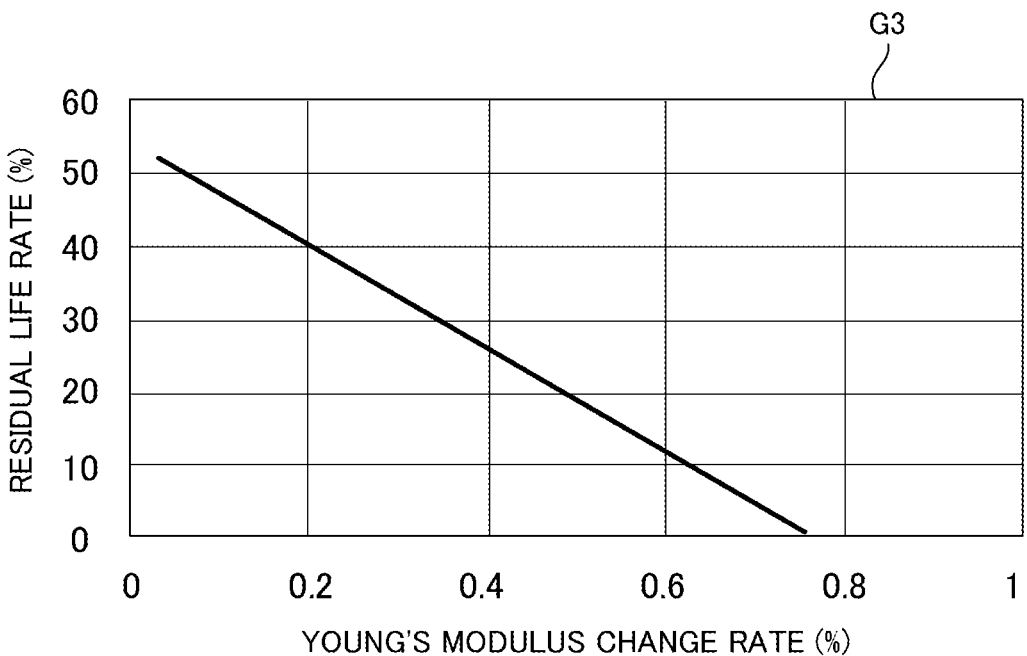
FIG. 3 is an explanatory drawing of the correspondence map between a physical property value degradation degree and a residual life, with the knuckle as the target component.

In step S20, the first estimated residual life recognition unit 12 applies the load applied to the knuckle, which is indicated by the load measurement information Lmi, to the load-fatigue degree map illustrated in G1 in FIG. 2, and obtains the weight. Then, the first estimated residual life recognition unit 12 calculates a total value of a weighted number of times of each load obtained for the load measurement information Lmi acquired by then as the cumulative fatigue degree as illustrated in G2 in FIG. 2.

In following step S21, when the cumulative fatigue degree is 3.7% for example, the first estimated residual life recognition unit 12 recognizes 96.3% for which 3.7% is subtracted from 100% as the first estimated residual life of the knuckle. In next step S22, the residual life determination unit 15 determines the first estimated residual life as the residual life of the knuckle, transmits residual life information RLi indicating the residual life of the knuckle to the user terminal 60, and advances the processing to step S2.

Thus, by a maintenance coping application for the vehicle 50 executed in the user terminal 60, a screen indicating the residual life of the knuckle is displayed at a display unit of the user terminal 60, and the residual life of the knuckle is notified. Note that the first estimated residual life recognition unit 12 may transmit the residual life information RLi to the ECU 51 of the vehicle 50 to have the residual life of the knuckle be displayed on a display 52 of the vehicle 50.

In step S3, the second estimated residual life recognition unit 14 calculates the Young's modulus change rate from the Young's modulus of the knuckle indicated by the physical property value measurement information Pmi. In following step S4, the second estimated residual life recognition unit 14 applies the Young's modulus change rate to the physical property value degradation degree-residual life map illustrated in G3 in FIG. 3, and recognizes the second estimated residual life.

In next step S5, the residual life determination unit 15 compares the first estimated residual life recognized by the first estimated residual life recognition unit 12 and the second estimated residual life recognized by the second estimated residual life recognition unit 14. Then, the residual life determination unit 15 advances the processing to step S3 when the second estimated residual life is longer than the first estimated residual life, and advances the processing to step S1 when the second estimated residual life is equal to or shorter than the first estimated residual life.

Figure 6:
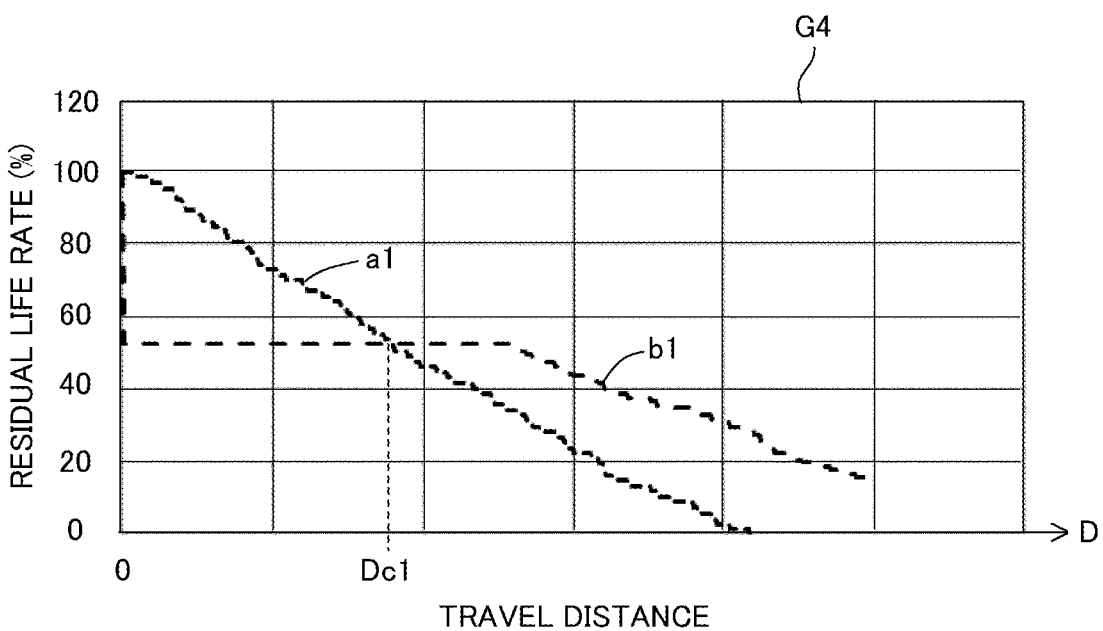
FIG. 6 is an explanatory drawing of determination of the residual life based on a first estimated residual life and a second estimated residual life, with the knuckle as the target component.
Figure 6:
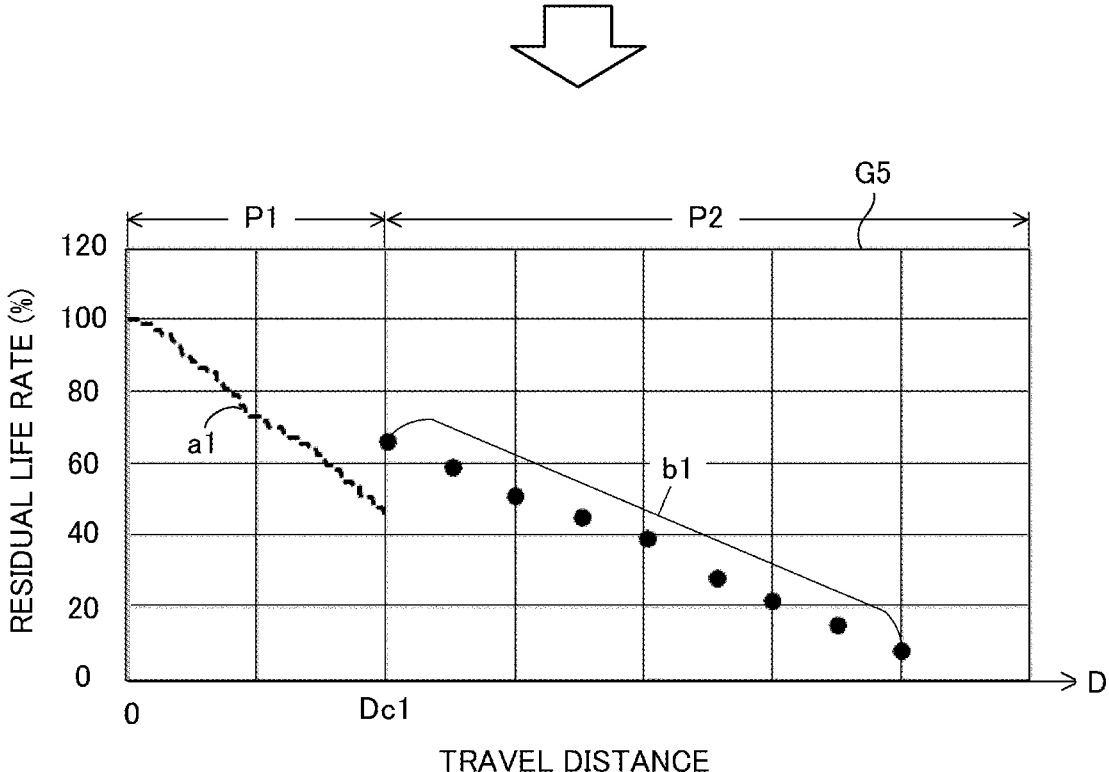

In step S6, the residual life determination unit 15 determines the second estimated residual life as the residual life of the knuckle, and transmits the residual life information RLi indicating the residual life of the knuckle to the user terminal. Here, G4 in FIG. 6 is a comparative graph in which the vertical axis is set as the residual life rate of the knuckle, the horizontal axis is set as a travel distance (total travel distance) D of the vehicle 50, a first estimated residual life rate is denoted by a1, and a second estimated residual life rate is denoted by b1. In G4, when the travel distance becomes Dc1, the second estimated residual life becomes longer than the first estimated residual life.

Therefore, as illustrated in G5 in FIG. 6, the residual life determination unit 15 determines the first estimated residual life a1 as the residual life of the knuckle in a first period P1 before Dc1, and determines the second estimated residual life b2 as the residual life of the knuckle in a second period P2 after Dc1.

In next step S7, the residual life determination unit 15 preserves information of the second estimated residual life (information of the most recent second estimated residual life) in the memory 20. Following step S8 to step S13 and step S30 to step S32 in FIG. 5 are the processing of correcting the second estimated residual life by the first estimated residual life. By the loop processing of step S8 and step S9, the load measurement information acquisition unit 11 advances the processing to step S30 when the load measurement information Lmi transmitted from the vehicle 50 is received and acquired by the communication unit 30 in step S8. In addition, the physical property value measurement information acquisition unit 13 advances the processing to step S10 when the physical property value measurement information Pmi transmitted from the measuring device 70 is received and acquired by the communication unit 30 in step S9.

In step S30, the first estimated residual life recognition unit 12 applies the load applied to the knuckle, which is indicated by the load measurement information Lmi, to the load-fatigue degree map illustrated in G1 in FIG. 2, and obtains the weight. Then, the first estimated residual life recognition unit 12 calculates the total value of the weighted number of times of each load obtained for the load measurement information Lmi acquired by then as the cumulative fatigue degree as illustrated in G2 in FIG. 2, and recognizes the first estimated residual life by subtracting the cumulative fatigue degree from 100% in next step S31.

In following step S32, the residual life determination unit 15 performs correction of subtracting a decrement of the first estimated residual life recognized at the first timing before the next second timing from the second estimated residual life recognized at the most recent second timing, and determines the residual life of the knuckle. In G6 in FIG. 7, the vertical axis is set as the residual life rate of the knuckle, the horizontal axis is set as the travel distance of the vehicle 50, and an example of correcting the second estimated residual life b1 by the first estimated residual life a1 is illustrated. Reference characters b11 to b19 each denotes the second estimated residual life recognized at each second timing in the second period P2.

For example, for the second estimated residual life b11, the residual life determination unit 15 determines the residual life of the knuckle by successively subtracting a decrement c of the first estimated residual life recognized before the next second estimated residual life b12 is recognized from the second estimated residual life b11. It is similar for b12 to b19. The residual life determination unit 15 transmits residual life information RLi indicating the residual life of the knuckle determined in such a manner to the user terminal 60, and advances the processing to step S9. Thus, the user U can be prevented from feeling uneasy due to a sudden decrease of the residual life rate of the knuckle notified to the user U.

In step S10, the second estimated residual life recognition unit 14 calculates the Young's modulus change rate by the Young's modulus of the knuckle indicated by the physical property value measurement information Pmi. In following step S11, the second estimated residual life recognition unit 14 applies the Young's modulus change rate to the physical property value degradation degree-residual life map illustrated in G3 in FIG. 3, and recognizes the second estimated residual life.

In next step S12, the residual life determination unit 15 determines the second estimated residual life as the residual life of the knuckle, and transmits the residual life information RLi indicating the residual life of the knuckle to the user terminal. In following step S13, the residual life determination unit 15 preserves the information of the recognized second estimated residual life (the most recent second estimated residual life) in the memory 20, and advances the processing to step S8.

3. Second Example

As the second example, the processing by the residual life determination system 1 when the target component 53 is a power semiconductor provided in the vehicle 50 will be explained with reference to FIG. 8 to FIG. 10. The power semiconductor is used in a motor, a charger, an inverter which drives an air conditioning compressor or the like and a DC-DC converter, for example.

Figure 8:
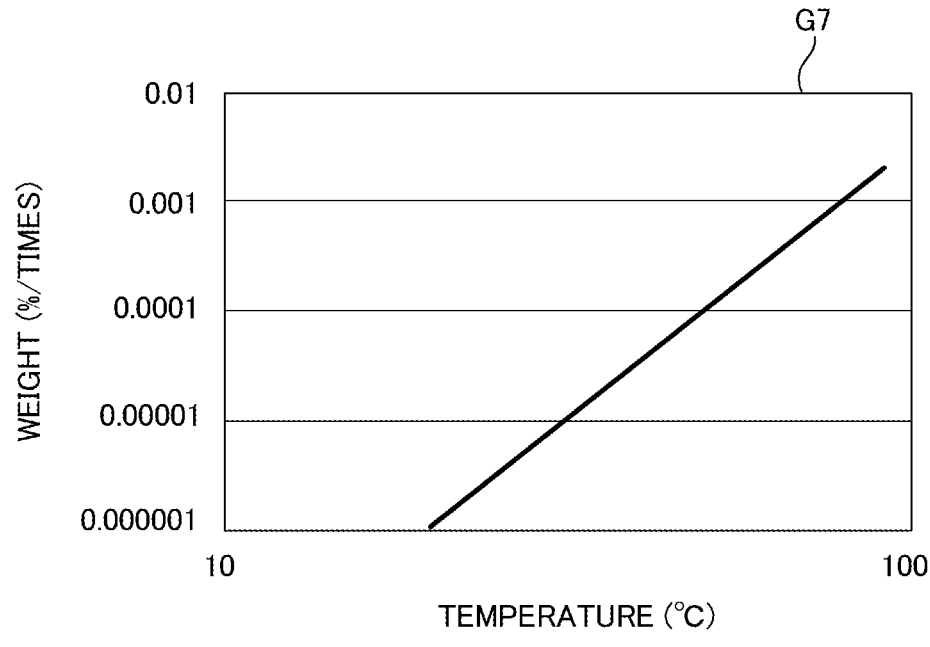
FIG. 8 is an explanatory drawing of the correspondence map between the load and the fatigue degree and the calculation of the cumulative fatigue degree, with a power semiconductor as the target component.
Figure 8:
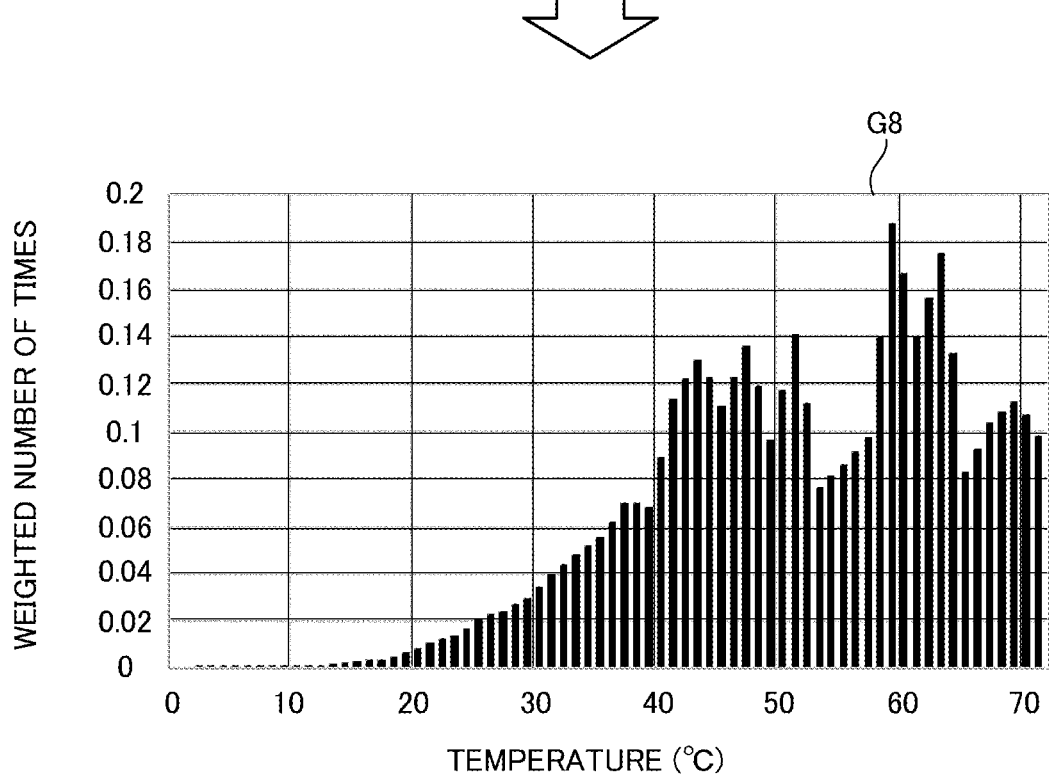
Figure 9:
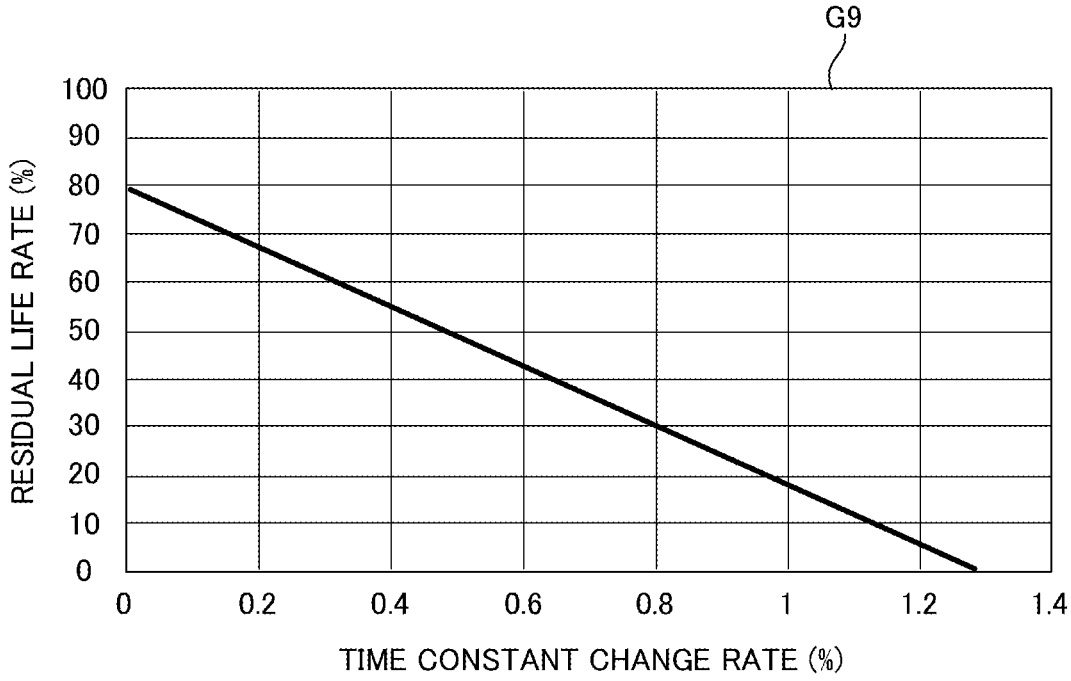
FIG. 9 is an explanatory drawing of the correspondence map between the physical property value degradation degree and the residual life, with the power semiconductor as the target component.
Figure 10:
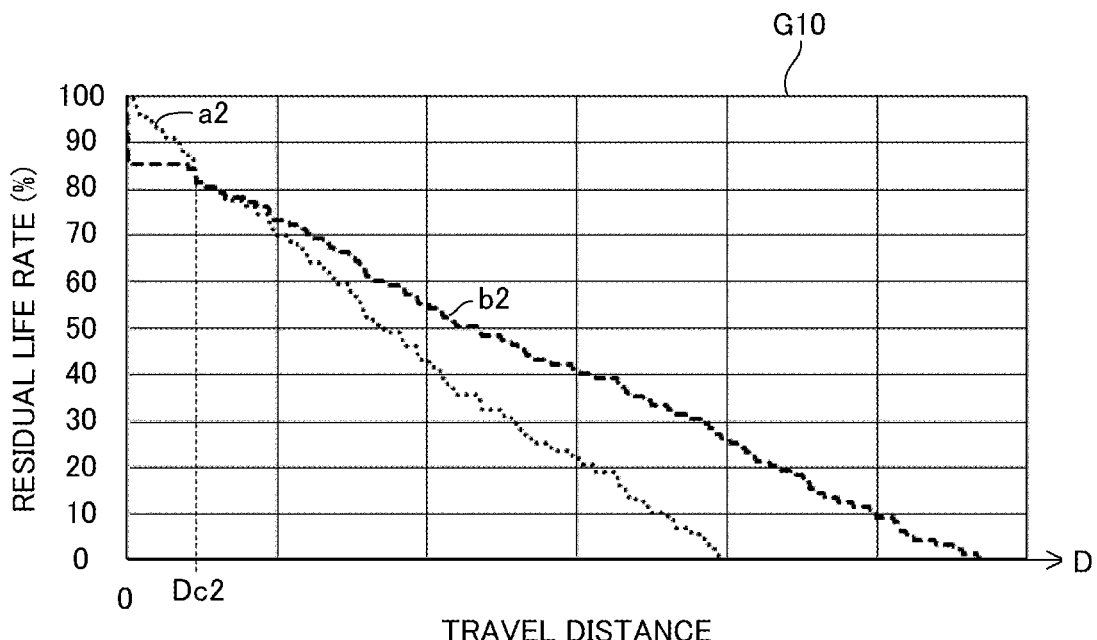
FIG. 10 is an explanatory drawing of the determination of the residual life based on the first estimated residual life and the second estimated residual life, with the power semiconductor as the target component.

In the second example, the map information MPi transmitted from the vehicle maker server 210 includes the load-fatigue degree map illustrated in G7 in FIG. 8 and the physical property value degradation degree-residual life map illustrated in G9 in FIG. 9.

In the load-fatigue degree map illustrated in G7, the horizontal axis is set as a temperature change width (temperature change width by heat generation at the time of an operation) of the power semiconductor, the vertical axis is set as the weight of the degradation degree when the power semiconductor becomes each temperature change width (the decreasing degree of the residual life), and the correspondence relation between them is illustrated. The weight is set based on a result of a power semiconductor power cycle test executed at the vehicle maker. That is, the person in charge at the vehicle maker executes the power semiconductor power cycle test while changing a temperature of the power semiconductor, and obtains the cycle count at which the power semiconductor fails (failure cycle count) at each temperature. Then, the person in charge generates the load-fatigue degree map of G7 using as the weight the value for which 100 is divided by the failure cycle count, for each temperature.

In the physical property value degradation degree-residual life map illustrated in G9, the horizontal axis is set as a time constant change rate of the power semiconductor, the vertical axis is set as the residual life of the power semiconductor, and the correspondence relation between them is illustrated. The residual life rate indicates the ratio of the remaining life when the residual life rate of the power semiconductor at the point of time when the use of the vehicle 50 is started is 100%. The time constant change rate indicates the change rate of a time constant of the power semiconductor from the point of time when the use of the vehicle 50 is started.

The physical property value degradation degree-residual life map illustrated in G9 is set based on the result of the power semiconductor power cycle test executed at the vehicle maker. That is, the person in charge at the vehicle maker executes the power semiconductor power cycle test while fixing the temperature of the power semiconductor, and measures the time constant of the power semiconductor at every predetermined cycle count (for example, 1,000 cycles) until the cycle count at which the power semiconductor fails. Then, the person in charge defines that the residual life rate is 100% when the cycle count is 0 and the residual life rate is 0% at the failure cycle count, and creates the physical property value degradation degree-residual life map illustrated in G9 in FIG. 9.

The time constant of the power semiconductor indicates a heat radiation speed (cooling easiness) of the power semiconductor, and the time constant becomes large when the heat radiation speed of the power semiconductor declines due to degradation such as a crack at a solder layer of the power semiconductor. The time constant of the power semiconductor is measured by measuring a lowering degree of the temperature of the power semiconductor from the point of time when drive of the power semiconductor is stopped.

The load measurement information acquisition unit 11 receives and acquires the load measurement information Lmi indicating a measured temperature of the power semiconductor, which is transmitted from the vehicle 50, by the communication unit 30. In the vehicle 50, the temperature of the power semiconductor is detected by a temperature sensor provided in the vehicle 50. The first estimated residual life recognition unit 12 applies the temperature of the power semiconductor recognized from the load measurement information Lmi to the load-fatigue degree map illustrated in G7 in FIG. 8, and obtains the corresponding weight. Then, the first estimated residual life recognition unit 12 calculates the cumulative fatigue degree by totaling the weighted number of times of each temperature as illustrated in G8 in FIG. 8, subtracts the cumulative fatigue degree from 100%, and recognizes the first estimated residual life.

The physical property value measurement information acquisition unit 13 receives and acquires the physical property value measurement information Pmi indicating the time constant of the power semiconductor, which is transmitted from the measuring device 70, by the communication unit 30. The second estimated residual life recognition unit 14 calculates the time constant change rate of the power semiconductor by the time constant of the power semiconductor recognized from the physical property value measurement information Pmi, applies the time constant change rate to the physical property value degradation degree-residual life map illustrated in G9 in FIG. 9, and recognizes the second estimated residual life of the power semiconductor.

The residual life determination unit 15 compares the first estimated residual life and the second estimated residual life and determines the residual life of the power semiconductor, similarly to the first example described above. G10 in FIG. 10 is a comparative graph in which the vertical axis is set as the residual life rate of the power semiconductor, the horizontal axis is set as the travel distance of the vehicle 50, the first estimated residual life is denoted by a2, and the second estimated residual life is denoted by b2. In G10, when the travel distance becomes Dc2, the second estimated residual life b2 becomes longer than the first estimated residual life a1.

Therefore, the residual life determination unit 15 determines the residual life of the power semiconductor based on the first estimated residual life a2 in the first period before Dc2 at which the second estimated residual life becomes longer than the first estimated residual life. In addition, in the second period after Dc2 at which the second estimated residual life becomes longer than the first estimated residual life, the residual life determination unit 15 determines the residual life of the power semiconductor based on the second estimated residual life and by correcting the second estimated residual life by the first estimated residual life.

4. Third Example

As the third example, the processing by the residual life determination system 1 when the target component 53 is a low current circuit board provided in the vehicle 50 will be explained with reference to FIG. 11 to FIG. 13. Here, since it is difficult to directly measure the physical property value with which the residual life of the low current circuit board can be determined, the case of providing the low current circuit board and a dummy test piece in the vehicle 50 and measuring a resistance value of the dummy test piece as the physical property value of the low current circuit board will be explained. The dummy test piece is designed such that a chip resistor is mounted and a degradation state of solder joining the chip resistor and the circuit board is determined by the resistance value of the dummy test piece.

Figure 11:
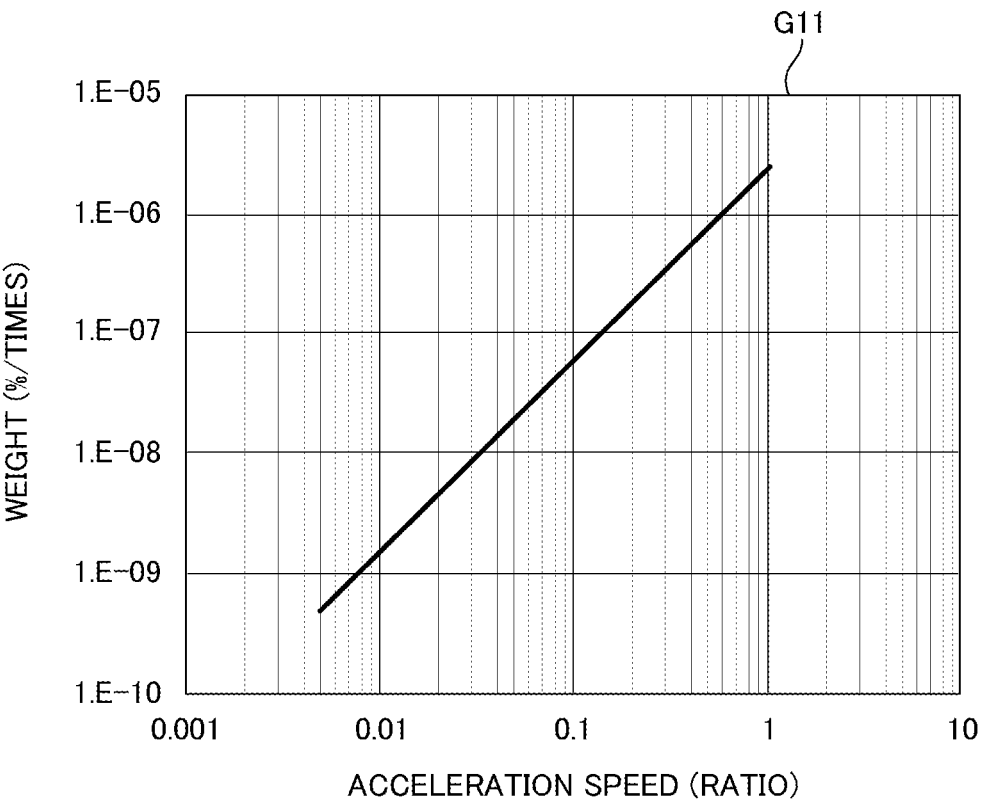
FIG. 11 is an explanatory drawing of the correspondence map between the load and the fatigue degree, with a low current circuit board as the target component.
Figure 12:
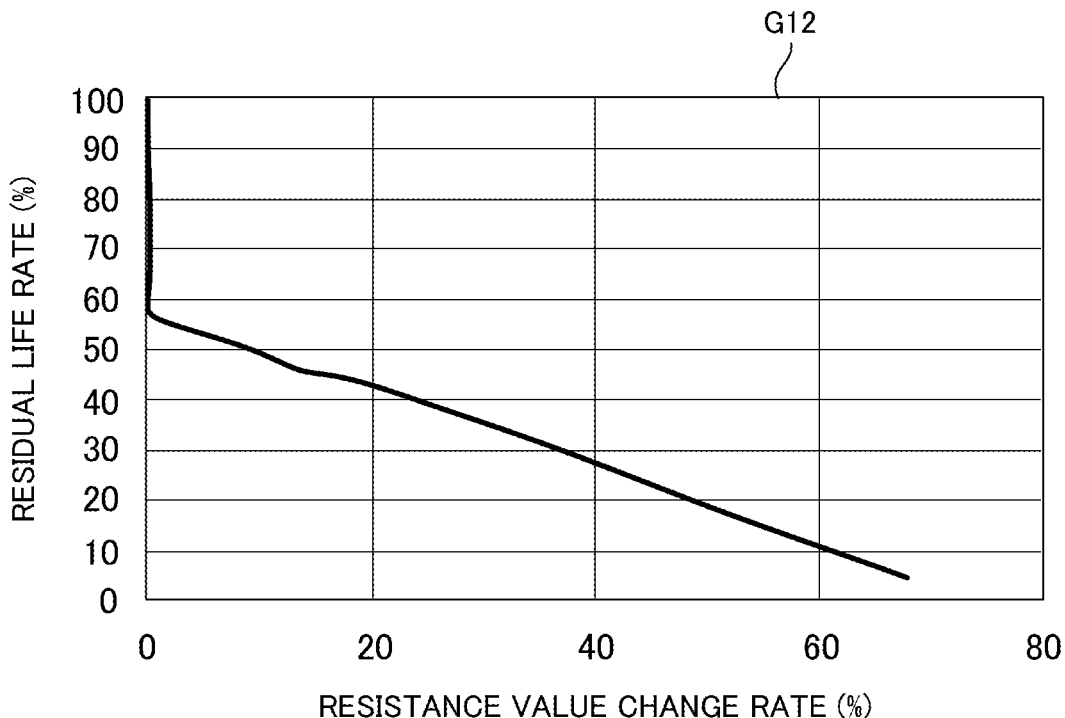
FIG. 12 is an explanatory drawing of the correspondence map between the physical property value degradation degree and the residual life, with the low current circuit board as the target component.
Figure 13:
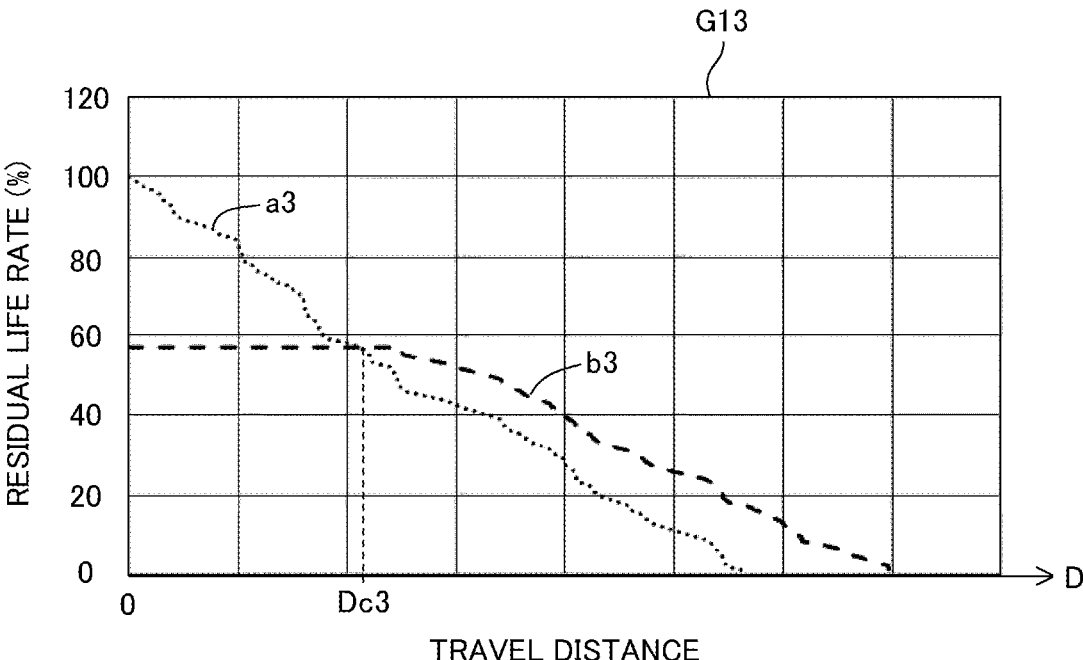
FIG. 13 is an explanatory drawing of the determination of the residual life based on the first estimated residual life and the second estimated residual life, with the low current circuit board as the target component.

In the third example, the map information MPi transmitted from the vehicle maker server 210 includes the load-fatigue degree map illustrated in G11 in FIG. 11 and the physical property value degradation degree-residual life map illustrated in G12 in FIG. 12.

In the load-fatigue degree map illustrated in G11, the horizontal axis is set as an acceleration speed measured in the vehicle 50, the vertical axis is set as the weight of the degradation degree of the low current circuit board when each acceleration speed is measured (the decreasing degree of the residual life), and the correspondence relation between them is illustrated. The weight is set based on a result of a vibration durability test simultaneously executed to the low current circuit board at the vehicle maker.

That is, the person in charge at the vehicle maker executes the vibration durability test of the low current circuit board and the dummy test piece while changing the acceleration speed, and obtains the cycle count at which the low current circuit board fails (failure cycle count) at each acceleration speed. Then, the person in charge generates the load-fatigue degree map of G11 using as the weight the value for which 100 is divided by the failure cycle count, for each acceleration speed.

In the physical property value degradation degree-residual life map illustrated in G12, the horizontal axis is set as a resistance value change rate of the dummy test piece, the vertical axis is set as the residual life rate of the low current circuit board, and the correspondence relation between them is illustrated. The residual life rate indicates the ratio of the remaining life of the low current circuit board when the residual life rate of the low current circuit board at the point of time when the use of the vehicle 50 is started is 100%. The resistance value change rate indicates the change rate of the resistance value of the dummy test piece from the point of time when the use of the vehicle 50 is started.

The physical property value degradation degree-residual life map illustrated in G12 is set based on the result of the vibration durability test simultaneously executed for the low current circuit board and the dummy test piece at the vehicle maker. That is, the person in charge at the vehicle maker executes the vibration durability test of the low current circuit board and the dummy test piece at a predetermined frequency while fixing the acceleration speed until the low current circuit board fails, and measures the resistance value of the dummy test piece every time a predetermined cycle count elapses.

Then, the person in charge defines that the residual life rate is 100% when the cycle count is 0 and the residual life rate is 0% at the cycle count at which the low current circuit board fails (failure cycle count), converts the cycle count to the residual life rate, and generates the physical property value degradation degree-residual life map illustrated in G12.

The load measurement information acquisition unit 11 receives and acquires the load measurement information Lmi indicating the acceleration speed, which is transmitted from the vehicle 50, by the communication unit 30. The first estimated residual life recognition unit 12 applies the acceleration speed recognized from the load measurement information Lmi to the load-fatigue degree map illustrated in G11 in FIG. 11, and obtains the corresponding weight. Then, the first estimated residual life recognition unit 12 calculates the cumulative fatigue degree by totaling the weighted number of times of each acceleration speed, subtracts the cumulative fatigue degree from 100%, and recognizes the first estimated residual life.

The physical property value measurement information acquisition unit 13 receives and acquires the physical property value measurement information Pmi indicating the resistance value of the dummy test piece, which is transmitted from the measuring device 70, by the communication unit 30. The second estimated residual life recognition unit 14 calculates the resistance change rate of the dummy test piece by the resistance value of the dummy test piece recognized from the physical property value measurement information Pmi. Then, the second estimated residual life recognition unit 14 applies the resistance change rate of the dummy test piece to the physical property value degradation degree-residual life map illustrated in G12 in FIG. 12, and recognizes the second estimated residual life of the low current circuit board.

The residual life determination unit 15 compares the first estimated residual life and the second estimated residual life and determines the residual life of the low current circuit board, similarly to the first example and the second example described above. G13 in FIG. 13 is a comparative graph in which the vertical axis is set as the residual life rate of the low current circuit board, the horizontal axis is set as the travel distance of the vehicle 50, the first estimated residual life is denoted by a3, and the second estimated residual life is denoted by b3. In G13, when the travel distance becomes Dc3, the second estimated residual life b3 becomes longer than the first estimated residual life a3.

Therefore, the residual life determination unit 15 determines the residual life of the low current circuit board based on the first estimated residual life a3 in the first period before Dc3 at which the second estimated residual life b3 becomes longer than the first estimated residual life a3. In addition, in the second period after Dc3 at which the second estimated residual life b3 becomes longer than the first estimated residual life a3, the residual life determination unit 15 determines the residual life of the low current circuit board based on the second estimated residual life b3 and by correcting the second estimated residual life b3 by the first estimated residual life a3.

5. Other Embodiments

In the embodiment described above, the knuckle, the power semiconductor and the low current circuit board provided in the vehicle 50 are exemplified as the target component to determine the residual life, however, the target component is not limited thereto, and as illustrated in FIG. 14, as long as it is the target component for which the cumulative fatigue degree and the physical property value can be measured, the residual life can be determined by the residual life determination system of the present disclosure.

In the embodiment described above, the vehicle 50 is indicated as the moving body of the present disclosure, however, the moving body of the present disclosure may be an airplane and a ship or the like.

Figure 7:
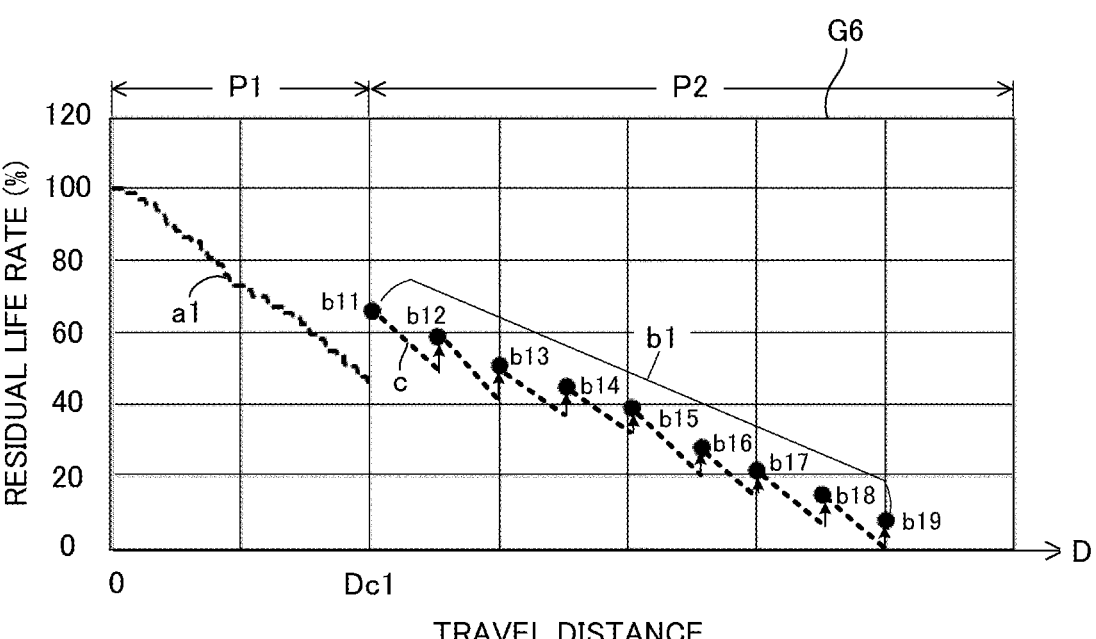
FIG. 7 is an explanatory drawing of correction of the second estimated residual life by the first estimated residual life.

In the embodiment described above, the residual life determination unit 15 corrects the second estimated residual life by the first estimated residual life as illustrated in FIG. 7, however, such correction may not be performed. Alternatively, correction by other methods may be performed.

Note that FIG. 1 is a schematic drawing in which the configuration of the residual life determination system 1 is divided according to main processing contents and illustrated in order to facilitate understanding of the present invention, and the residual life determination system 1 may be configured by other divisions. In addition, the processing of each component may be executed by one hardware unit or may be executed by a plurality of hardware units. Further, the processing by each component illustrated in FIG. 4 and FIG. 5 may be executed by one program or may be executed by a plurality of programs.

6. Configurations Supported by Embodiment Described Above

The embodiment described above is a specific example of the following configurations.

(Configuration 1) A residual life determination system which determines a residual life of a target component provided in a moving body, the residual life determination system including: a load measurement information acquisition unit configured to acquire load measurement information indicating a measurement result of loads applied to the target component when the moving body is used; a first estimated residual life recognition unit configured to recognize a first estimated residual life of the target component according to a cumulative fatigue degree of the target component based on the load measurement information; a physical property value measurement information acquisition unit configured to acquire physical property value measurement information indicating a measurement result of a physical property value of the target component; a second estimated residual life recognition unit configured to recognize a second estimated residual life of the target component according to a degradation degree of the physical property value of the target component based on the physical property value measurement information; and a residual life determination unit configured to determine the residual life of the target component based on the first estimated residual life in a first period before the second estimated residual life becomes longer than the first estimated residual life.

According to the residual life determination system of configuration 1, it is possible to appropriately determine the residual life of components used in the moving body such as the vehicle and contribute to value determination of the moving body.

(Configuration 2) The residual life determination system according to configuration 1, wherein the residual life determination unit determines the residual life of the target component based on the second estimated residual life in a second period after the second estimated residual life becomes longer than the first estimated residual life.

In the residual life determination system of configuration 2, the first estimated residual life is recognized according to the cumulative fatigue degree of the target component which can be relatively easily calculated, and the second estimated residual life is recognized according to the degradation degree of the physical property of the target component for which the measurement is troublesome even though accuracy of residual life determination becomes higher compared to the first estimated residual life. Then, by determining the residual life based on a first index value until the residual life based on a second index value becomes longer than the residual life based on the first index value and determining the residual life based on the second index value after the residual life based on the second index value becomes longer than the residual life based on the first index value, the residual life of the target component can be efficiently determined while maintaining the determination accuracy.

(Configuration 3) The residual life determination system according to configuration 2, wherein the load measurement information acquisition unit acquires the load measurement information by receiving the load measurement information transmitted at a first timing from the moving body, the physical property value measurement information acquisition unit acquires the physical property value measurement information by receiving the physical property value measurement information transmitted at a second timing from a measuring device which measures the physical property value at the time of maintenance of the moving body, and the residual life determination unit determines the residual life of the target component based on the second estimated residual life recognized by the second estimated residual life recognition unit at the previous second timing and the first estimated residual life recognized by the first estimated residual life recognition unit at every first timing, in a period of time from the previous second timing to the next second timing in the second period.

According to the residual life determination system of configuration 3, the residual life of the target component can be accurately recognized by the degradation degree of the physical property at the second timing, and the residual life of the target component can be updated and recognized by using the first index value recognized based on the cumulative fatigue degree at every first timing until the next second timing.

(Configuration 4) The residual life determination system according to configuration 3, wherein the residual life determination unit determines the residual life of the target component by correcting the first estimated residual life recognized by the first estimated residual life recognition unit at every first timing by the second estimated residual life recognized by the second estimated residual life recognition unit at the previous second timing, in the period of time from the previous second timing to the next second timing in the second period.

According to the residual life determination system of configuration 4, by subtracting the decrement of the residual life of the target component based on the first index value based on the residual life of the target component recognized based on the second index value, a use situation of the target component is promptly reflected and the residual life of the target component can be determined while maintaining the determination accuracy of the residual life.

(Configuration 5) The residual life determination system according to any one of configuration 1 to configuration 4, wherein the moving body is provided with a dummy test piece for measuring the physical property value of the target component, and the physical property value measurement information acquisition unit acquires the physical property value measurement information indicating the measurement result of the physical property value by the dummy test piece.

According to the residual life determination system of configuration 5, when it is difficult to measure the physical property value of the target component, the physical property value of the target component can be recognized by using the physical property value measured by the dummy test piece provided in the moving body beforehand.

(Configuration 6) A residual life determination method executed by a computer in order to determine a residual life of a target component provided in a moving body, the residual life determination method including: a load measurement information acquisition step of acquiring load measurement information indicating a measurement result of loads applied to the target component when the moving body is used; a first estimated residual life recognition step of recognizing a first estimated residual life of the target component according to a cumulative fatigue degree of the target component based on the load measurement information; a physical property value measurement information acquisition step of acquiring physical property value measurement information indicating a measurement result of a physical property value of the target component; a second estimated residual life recognition step of recognizing a second estimated residual life of the target component according to a degradation degree of the physical property value of the target component based on the physical property value measurement information; and a residual life determination step of determining the residual life of the target component based on the first estimated residual life in a first period before the second estimated residual life becomes longer than the first estimated residual life.

By executing the residual life determination method of configuration 6 by the computer, effects similar to that of the residual life determination system of configuration 1 can be obtained.

REFERENCE SIGNS LIST

1 . . . residual life determination system, 10 . . . processor, 11 . . . load measurement information acquisition unit, 12 . . . first estimated residual life recognition unit, 13 . . . physical property value measurement information acquisition unit, 14 . . . second estimated residual life recognition unit, 15 . . . residual life determination unit, 20 . . . memory, 21 . . . program, 22 . . . data of load-fatigue degree map, 23 . . . data of physical property value degradation degree-residual life map, 30 . . . communication unit, 50 . . . vehicle (moving body), 51 . . . ECU, 52 . . . display, 53 . . . target component, 60 . . . user terminal, 70 . . . measuring device, 100 . . . car dealer, 101 . . . shop management system, 200 . . . communication network, 210 . . . vehicle maker server, U . . . user, V . . . staff (at car dealer).

What is claimed is:

1. A residual life determination system comprising:
a vehicle; and
a processor,
wherein the processor determines a residual life of a target component provided in the vehicle, and the processor is configured to:
acquire load measurement information indicating a measurement result of loads applied to the target component when the vehicle is used;
recognize a first estimated residual life of the target component according to a cumulative fatigue degree of the target component based on the load measurement information;
acquire physical property value measurement information indicating a measurement result of a physical property value of the target component;
recognize a second estimated residual life of the target component according to a degradation degree of the physical property value of the target component based on the physical property value measurement information;
determine the residual life of the target component based on the first estimated residual life in a first period before the second estimated residual life becomes longer than the first estimated residual life; and
display the residual life of the target component at a display of a user terminal used by a user of the vehicle or a display of the vehicle.

2. The residual life determination system according to claim 1,
wherein the processor is configured to determine the residual life of the target component based on the second estimated residual life in a second period after the second estimated residual life becomes longer than the first estimated residual life.

3. The residual life determination system according to claim 2,
wherein the processor is configured to acquire the load measurement information by receiving the load measurement information transmitted at a first timing from the vehicle,
the processor is configured to acquire the physical property value measurement information by receiving the physical property value measurement information transmitted at a second timing from a measuring device which measures the physical property value at the time of maintenance of the vehicle, and
the processor is configured to determine the residual life of the target component based on the second estimated residual life recognized at the previous second timing and the first estimated residual life recognized at every first timing, in a period of time from the previous second timing to the next second timing in the second period,
the vehicle is provided with a dummy test piece for measuring the physical property value of the target component, and the measuring device is configured to measure a resistance value of the dummy test piece as the physical property value, and
the processor is configured to acquire the physical property value measurement information indicating the measurement result of the physical property value by the dummy test piece.

4. The residual life determination system according to claim 3,
wherein the processor is configured to determine the residual life of the target component by correcting the first estimated residual life recognized at every first timing by the second estimated residual life recognized at the previous second timing, in the period of time from the previous second timing to the next second timing in the second period.

5. The residual life determination system according to claim 2,
wherein the processor is configured to acquire the load measurement information by receiving the load measurement information transmitted at a first timing from the vehicle,
the processor is configured to acquire the physical property value measurement information by receiving the physical property value measurement information transmitted at a second timing from a measuring device which measures the physical property value at the time of maintenance of the vehicle,
the processor is configured to determine the residual life of the target component based on the second estimated residual life recognized at the previous second timing and the first estimated residual life recognized at every first timing, in a period of time from the previous second timing to the next second timing in the second period, and
the target component is a knuckle provided in the vehicle, the measuring device is configured to measure a Young's modulus of the knuckle as the physical property value.

6. The residual life determination system according to claim 2, wherein the processor is configured to acquire the load measurement information by receiving the load measurement information transmitted at a first timing from the vehicle, the processor is configured to acquire the physical property value measurement information by receiving the physical property value measurement information transmitted at a second timing from a measuring device which measures the physical property value at the time of maintenance of the vehicle, the processor is configured to determine the residual life of the target component based on the second estimated residual life recognized at the previous second timing and the first estimated residual life recognized at every first timing, in a period of time from the previous second timing to the next second timing in the second period, and the target component is a power semiconductor provided in the vehicle, the measuring device is configured to measure a time constant of the power semiconductor as the physical property value.

7. A residual life determination method executed by a processor in order to determine a residual life of a target component provided in a vehicle, the residual life determination method comprising:

acquiring load measurement information indicating a measurement result of loads applied to the target component when the vehicle is used;

recognizing a first estimated residual life of the target component according to a cumulative fatigue degree of the target component based on the load measurement information;

acquiring physical property value measurement information indicating a measurement result of a physical property value of the target component;

recognizing a second estimated residual life of the target component according to a degradation degree of the physical property value of the target component based on the physical property value measurement information;

determining the residual life of the target component based on the first estimated residual life in a first period before the second estimated residual life becomes longer than the first estimated residual life; and displaying the residual life of the target component at a display of a user terminal used by a user of the vehicle or a display of the vehicle.

*   *   *   *   *